United States Patent [19]

Austin et al.

[11] Patent Number: 4,864,652
[45] Date of Patent: Sep. 5, 1989

[54] METHOD AND APPARATUS FOR REDUCING RADIATION EXPOSURE THROUGH THE USE OF INFRARED DATA TRANSMISSION

[75] Inventors: Frank S. Austin, Schaghticoke; Albert B. Hance, Schenectady, both of N.Y.

[73] Assignee: The United States of America as represented by the Department of Energy, Washington, D.C.

[21] Appl. No.: 146,627

[22] Filed: Jan. 21, 1988

[51] Int. Cl.$^4$ .............................................. H04B 9/00
[52] U.S. Cl. .................................... 455/617; 455/607; 455/608
[58] Field of Search ............... 455/600, 606, 607, 608, 455/612, 617, 618, 619; 299/1, 30; 367/25, 64; 364/422; 370/4; 340/854

[56] References Cited

U.S. PATENT DOCUMENTS

| | | | |
|---|---|---|---|
| 4,331,953 | 5/1982 | Blevins | 340/825.69 |
| 4,420,840 | 12/1983 | Livermore | 455/606 |
| 4,442,426 | 4/1984 | Henschmann | 455/617 |
| 4,571,735 | 2/1986 | Furse | 375/19 |
| 4,707,823 | 11/1987 | Holdren | 370/4 |
| 4,748,617 | 5/1988 | Drewlo | 455/612 |

FOREIGN PATENT DOCUMENTS 0166836 10/1983 Japan ................... 455/612

Primary Examiner—Benedict V. Safourek
Assistant Examiner—L. Van Beek
Attorney, Agent, or Firm—William W. Randolph; Judson R. Hightower; Richard E. Constant

[57] ABSTRACT

A method and apparatus is described for transmitting information, for example, dosimetry data from a hazardous environment such as a radioactive area to a remote relatively safe location. A radiation detector senses the radiation and generates an electrical signal which is fed as a binary coded decimal signal to an infrared transmitter having a microprocessor. The microprocessor formats the detected information into digits of data and modulates a 40 kHz oscillator, the output of which is fed to and intensity modulates one or more infrared emitting diodes. The infrared signal from the diodes is transmitted to a portable hand-held infrared receiver remote from the hazardous environment. The receiver includes an infrared sensitive diode which decodes the data and generates an electrical signal which is coupled to a microcomputer. The microcomputer synchronizes itself to the transmitter, reads the digits of data as they are received, sums the digits and compares the sum with a checksum signal generated and transmitted from the transmitter. If a match of the checksum signals exists, the received data is displayed, otherwise it is described and the receiver conditions itself for the next transmission of data.

7 Claims, 2 Drawing Sheets

METHOD AND APPARATUS FOR REDUCING RADIATION EXPOSURE THROUGH THE USE OF INFRARED DATA TRANSMISSION

ORIGIN OF THE INVENTION

The invention described herein was made in the performance of work under contract with the Department of Energy, Contract No. DE-AC12-76-SN00052, and the U.S. Government has rights in the invention pursuant to this contract.

BACKGROUND OF THE INVENTION

The present invention relates to transmitting information from a hazardous environment to a relatively safe environment and more particularly to digitally transmitting dosimetry data from a radioactive area to a remote non-radioactive area.

In hazardous environments such as controlled surface contaminated areas of radioactivity, there is a need to monitor the level of radioactivity being emitted from a radioactive source without the danger of exposing personnel to the radiation.

While radio transmission could be used to communicate dosimetry information from a radioactive area to a safe site which is remote from the radioactive source, range of transmission, interference and security concerns limit its usefulness. Direct cable connections could be utilized but such an approach suffers from the inherent limitation of not being adaptable to varying equipment configurations and the potential danger for the spread of radioactive contamination when hard-wired equipment is used and moved from one place to another in a restricted area.

While optical communications systems using infrared carrier transmission are generally known, their use to reduce radiation exposure to personnel working in or around radioactive areas is not believed to be known.

SUMMARY OF THE INVENTION

Accordingly, it is the primary object of the present invention to provide for the communication of information from a hazardous environment to a non-hazardous location.

It is a further object of the invention to provide for the communication of digital data from a restricted area to a remote location.

It is another object of the invention to monitor the strength of a radioactive source from a remote location.

It is still another object of the invention to transmit dosimetry information from a radioactive area to a remote non-radioactive area.

And still a further object of the present invention is to transmit digital data information across the boundaries of a controlled surface contaminated area using infrared energy transmission.

The objects of the present invention are fulfilled by a method and apparatus for transmitting dosimetry data from a radioactive area to a remote location through the use of infrared data transmission. Dosimetry information is read from a dosimeter located in a radioactive area. A microprocessor coupled to the dosimeter formats the information and modulates an oscillator with the data. The output of the oscillator drives at least one infrared emitting diode which transmits continuous serial data to a portable hand-held infrared receiver carried by someone located remotely from the radioactive area. Following the transmission of a synchronous start signal, the dosimetry data is transmitted in two sequential bytes containing four digits of data. Next a checksum byte of the four digits is is generated and transmitted to the receiver. The receiver also sums the four incoming digits of data and compares the results to the received checksum byte. If the checksum and sum of the digits at the receiver are equal, the data is displayed in a digital format. If the checksum byte does not match the sum byte of the receiver, the data is discarded and the process reinitiated with the receiver responding to a subsequent synchronous start signal.

BRIEF DESCRIPTION OF THE DRAWINGS

The objects of the present invention and the attendant advantages thereof will become readily apparent by reference to the following drawings wherein like numerals refer to like parts, and wherein.

DETAILED DESCRIPTION OF THE INVENTION

Figure 1:
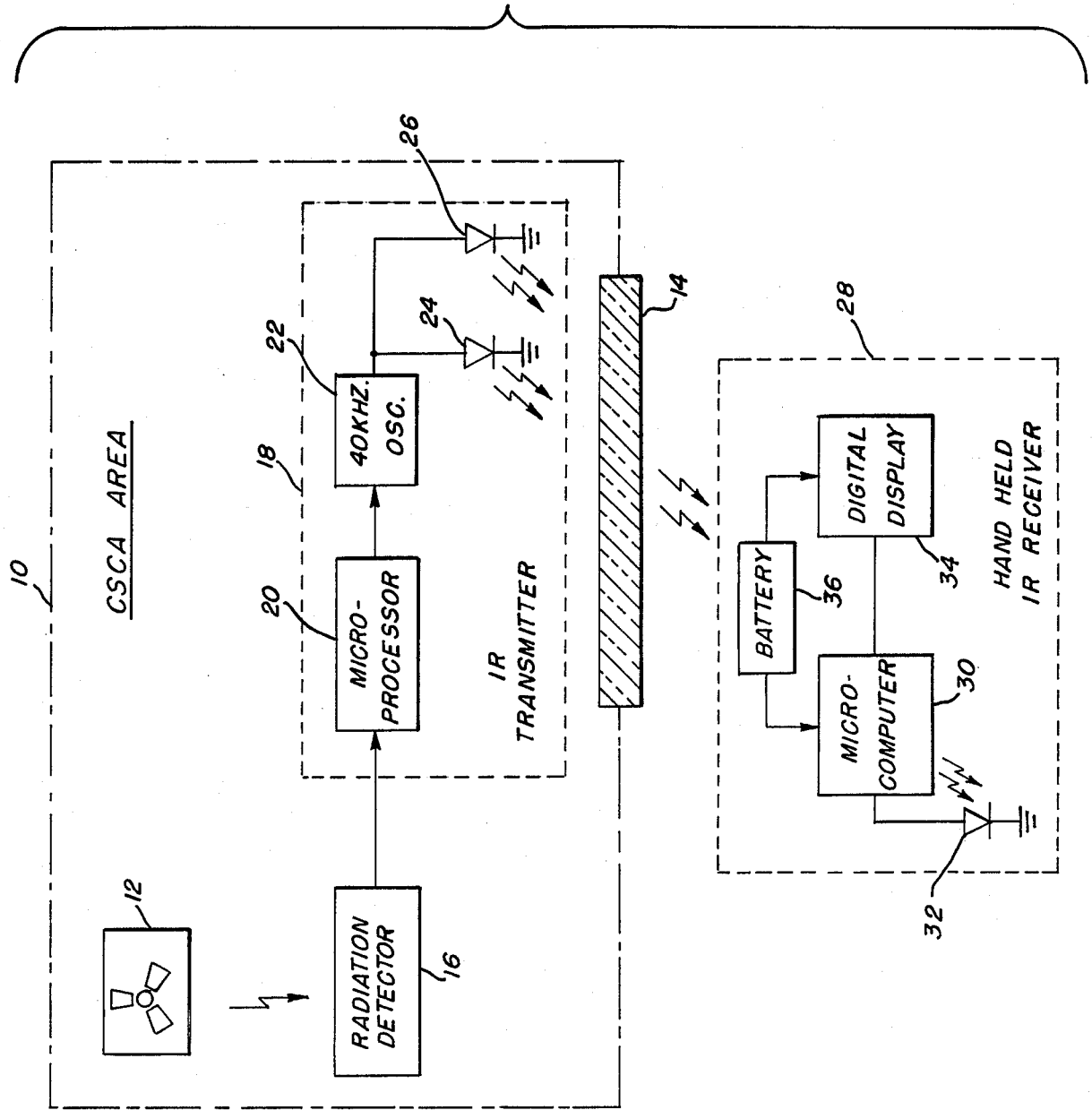
FIG. 1 is a block diagram illustrative of the preferred embodiment of the invention.

Referring now to the drawings and more particularly to FIG. 1, reference numeral 10 denotes a controlled surface contaminated area (CSCA) wherein there is located a source of radioactive radiation 12 whose strength of radioactivity requires monitoring without exposing personnel to the radiation. The CSCA area 10, for example, may comprise a hood or glove box having a transparent aperture or window 14 made of glass or clear plastic material. The integrity of the interior of the CSCA area 10 is maintained by means, for example, of seals which are well known to those skilled in the art.

Further as shown in FIG. 1, a radiation detector 16 in the form of a dosimeter, generates an electrical signal indicative of the level of radiation existing within the CSCA area 10. This signal is coupled to an infrared transmitter 18 which is mounted in a fixed position, for example, adjacent the transparent window 14. The infrared transmitter 18 includes a microprocessor 20, a 40 kHz oscillator 22 and a pair of infrared emitting diodes 24 and 26. Dosimetry information of data from the radiation detector 16 is coupled to the microprocessor 20 which formats the information into a serial binary digital data stream which amplitude modulates the output of the oscillator 22. The signal output of the oscillator 22 is commonly coupled to the infrared diodes 24 and 26 whose brightness is intensity modulated by the oscillator signal. The intensity modulated infrared energy is next transmitted across the boundary of the CSCA area 10 through the window 14.

The diodes 24 and 26 emit the same optical signal either in the same or different directions through the window 14 whereupon the infrared energy is received by a portable optical energy receiver 28 which may be, for example, a hand held IR receiver which is brought into proximity of the window 14 by one seeking to measure the level of radiation of the source 12. It should be noted that the format of information encoded and transmitted by the IR transmitter 18 can be of any desired type such as a binary coded decimal information signal or a count rate data information signal.

The portable hand held infrared receiver 28 is comprised of a microcomputer 30 coupled to an infrared receiving diode 32 and a liquid crystal alphanumeric display device 34, with all the components being powered by a self contained battery pack 36. Accordingly, a beam of infrared light encoded with dosimeter data is detected and decoded by the receiver diode 32. The decoded information is thereafter formatted by the microcomputer 30 and sent to the liquid crystal display where it can be readily read by personnel carrying the receiver 28 outside of the CSCA area 10. Although not shown, the receiver 28 also includes circuitry to discriminate against ambient infrared light.

Figure 2:
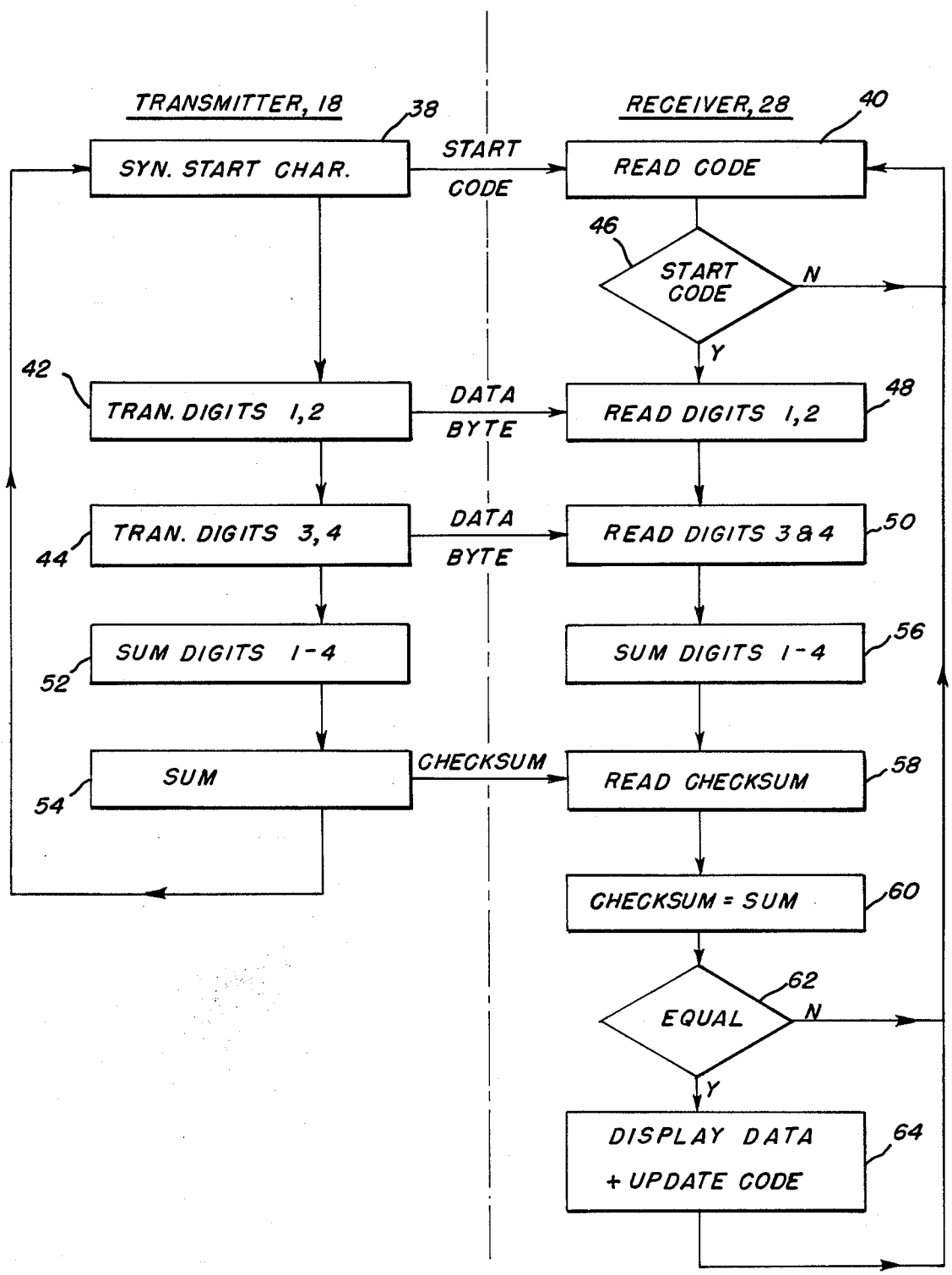
FIG. 2 is a flow chart illustrative of the method by which the dosimetry data in the embodiment shown in FIG. 1 is transmitted to a remote location.

Referring now to FIG. 2, shown thereat is a flow chart illustrative of the method by which dosimetry data is formatted in the infrared transmitter 18 and transmitted to and received by the infrared receiver 28. Data transfer from transmitter to receiver is first preceded by a synchronization step as denoted by the block 38 wherein an ASCII synchronous start character signal is generated at the transmitter 18 and transmitted to the receiver 28 where it is read as indicated by block 40. Following this, the microprocessor 20 in the transmitter 18 generates and sequentially transmits two data bytes containing digits of dosimetry data as indicated by the blocks 42 and 44 where the first data byte includes the first two digits (1,2) while the second data byte 44 includes the third and fourth digits (3,4). The digits are expressed, for example, in a binary coded decimal format. The receiver having recognized the start signal as indicated by the block 46, reads and stores the two data bytes containing the four digits 1 through 4 of data as they are received as indicated by the blocks 48 and 50.

Next the two data bytes containing digits 1 through 4 are summed in the transmitter 18 as evidenced by block 52 and a checksum byte generated therefrom as shown by block 54. The receiver 28 also sums the digits 1 through 4 received in accordance with block 56. The transmitter now transmits the checksum byte following the summing step 54 which is read by receiver in step 58. The receiver 28 compares the sum of the received digits with the received checksum bit per step 58 as shown by block 60. A decisional step 62 is next carried out to determine whether the checksum byte received is equal to the sum of the digits received. If the checksum and sum value are equal, the data is displayed per step 64 following which a recycle signal back to step 40 is provided. If the checksum byte and sum values are not equal, i.e. wherein the checksum byte of the transmitter 18 does not match the sum byte of the receiver 28, the received data is discarded, no display is generated, and there is a cycle back to the step 40 to look for the next synchronous start character transmitted from the transmitter per step 38.

The checksum logic sequence as shown and described with respect to FIG. 2 prevents erroneous data from being displayed at the receiver 28 due to lost digits of information occurring during transmission which can happen by physical interruptions of the transmitted infrared beam by someone walking between the transmitter 18 and the receiver 28 or some other obstruction interrupting the infrared beam while the hand held receiver is being carried from one location to another.

Due to the fact that the strength of the radioactive source can be continually monitored without the need of any personnel exposure, the present invention has widespread applications in addition to its use in connection with glove boxes and hoods. For example, it may be used in connection with radiography of pipe welds. Also it can be used in connection with the inspection and changing of HEPA filters in a high radiation environment. Also, individuals can be monitored for total integrated dosage instead of depending upon stay time or checking self-reading pocket dosimeters. Although the primary use of the invention is to minimize radiation exposure, it is applicable to other hazardous environments as well. For example, dust, chemical or extreme temperatures can be monitored without direct personal contact with the environment being monitored.

Having thus shown and described what is at present considered to be the preferred embodiment of the invention, it should be noted that the same has been made by way of illustration and not limitation. Accordingly, all modifications, alterations and changes coming within the spirit and scope of the invention are herein meant to be included.

We claim:

1. A method of communicating information from a relatively hazardous environment to a relatively safe environment comprising the steps of:
    (a) synchronizing information receiving means located at said relatively safe environment with information transmitting means located at said relatively hazardous environment by transmitting a synchronous start signal from said transmitting means to said receiving means;
    (b) transmitting a digital information signal from said transmitting means at said relatively hazardous environment to said receiving means at said relatively safe environment in a plural byte sequence each containing at least one digit of data;
    (c) summing the digits of said byte sequence in both said transmitting means and said receiving means;
    (d) generating and transmitting a checksum byte in said transmitting means to said receiving means;
    (e) determining whether or not the received checksum byte equals the sum of the digits received from said transmitting means in step (b);
    (f) displaying the received digital information signal at said receiving means if the checksum byte equals the sum of the digits received;
    (g) discarding the received information if the checksum byte does not equal the sum of the digits received; and
    (h) recycling said receiving means to be responsive to a subsequent synchronous start signal from said transmitting means.

2. The method as defined by claim 1 wherein said steps of transmitting said synchronous start signal and said information signal comprises the steps of optically transmitting and receiving said signals.

3. The method as defined by claim 2 wherein said step of optically transmitting said signals comprises the step of transmitting an infrared beam.

4. The method as defined by claim 3 wherein said plural byte sequence comprises two bytes containing four digits of information.

5. A method of transmitting dosimetry information from a radioactive area to a remote location, comprising the steps of:
    (a) synchronizing optical receiving means located at said remote location with optical transmitting means located in said radioactive area by optically transmitting a synchronous start coded signal from said transmitting means to said receiving means
    (b) reading said synchronous start coded signal at said receiving means;

(c) transmitting dosimetry data in two consecutive bytes containing four binary coded digits of data;
(d) reading and storing said digits of data in said receiving means;
(e) generating a checksum byte at said transmitting means and transmitting said checksum byte to said receiving means;
(f) reading and storing said checksum byte received by said receiving means;
(g) comparing the received checksum byte with the sum of the received digits of data at said receiving means;
(h) displaying the dosimetry data received if the checksum byte equals the sum of the digits of data received;
(i) discarding the received data when a non equality exists; and
(j) thereafter causing said receiving means to seek the next synchronous start signal per step (b).

6. The method as defined by claim 5 wherein said step of optically transmitting and receiving comprises transmitting and receiving on an infrared optical beam.

7. An optical communications system for translating information from a hazardous area to a remote receiving means in a relatively safe location, comprising:
(a) condition detector means located in the hazardous area for sensing conditions in the hazardous area and for generating signals of the sensed conditions in the hazardous area;
(b) optical transmitter means located in the hazardous area, coupled to said detector means and being responsive to said signals generated by said detector means for generating an optical output signal which is indicative of said sensed condition in said hazardous area and which is coded with synchronization data for an optical receiving means, said optical transmitter means comprising:
(1) a microprocessor coupled to said detector means for receiving the signals generated by said detector means and being programmed to format said synchronizing data and said sensed condition data in a digital data stream comprising a synchronous start signal, bytes containing digits of data representing the sensed condition and a checksum byte of the sum of said digits of data representing the sensed condition;
(2) an electrical signal oscillator coupled to said microprocessor for generating an output signal modulated by said digital data stream; and
(3) optical energy output means coupled to said oscillator and being responsive to said output signal of said oscillator to generate the optical output signal, said optical energy output means comprises at least one infrared emitting diode; and
(c) optical receiver means located at a remote location and responsive to said optical output signal by synchronizing with said optical transmitter means, by decoding said optical output signal and by displaying said decoded optical output signal when validly received, wherein said optical receiver means comprises:
(1) photosensitive detector means for detecting and decoding said optical output signal from said optical transmitter means;
(2) a microcomputer coupled to said photosensitive detector means and being programmed to format the decoded optical output signal and generate signals indicative of said sensed condition, wherein said microcomputer is programmed to read and store the decoded data digit by digit, sum the digits of data representing the sensed condition, and compare the sum of the digits of data with a checksum byte contained in the optical output signal and thereafter enable a display of said data in the event a match of the sums exists; and
(3) means responsive to said signals indicative of said sensed condition for providing a visual indication thereof.

* * * * *